United States Patent
Park et al.

(10) Patent No.: US 10,454,133 B2
(45) Date of Patent: Oct. 22, 2019

(54) SECONDARY BATTERY

(71) Applicant: Samsung SDI Co., Ltd., Yongin-si, Gyeonggi-do (KR)

(72) Inventors: Seunghee Park, Yongin-si (KR); Jeawoan Lee, Yongin-si (KR); Youngchang Lim, Yongin-si (KR); Soomi Eo, Yongin-si (KR); Euysun Jung, Yongin-si (KR); Kyung Kim, Yongin-si (KR); Jaemin Lim, Yongin-si (KR); Kyunghoon Cho, Yongin-si (KR); Kwonchul Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 148 days.

(21) Appl. No.: 15/357,934

(22) Filed: Nov. 21, 2016

(65) Prior Publication Data
US 2017/0149084 A1  May 25, 2017

(30) Foreign Application Priority Data

Nov. 20, 2015  (KR) .................. 10-2015-0163337

(51) Int. Cl.
*H01M 10/05* (2010.01)
*H01M 2/02* (2006.01)

(52) U.S. Cl.
CPC .......... *H01M 10/05* (2013.01); *H01M 2/021* (2013.01); *H01M 2220/30* (2013.01)

(58) Field of Classification Search
CPC ... H01M 10/05; H01M 2220/30; H01M 2/021
See application file for complete search history.

(56) References Cited

U.S. PATENT DOCUMENTS

| 9,088,025 B2 | 7/2015 | Lee et al. | |
| 2013/0130098 A1* | 5/2013 | Lee .............. | H01M 2/021 |
| | | | 429/178 |
| 2015/0194640 A1* | 7/2015 | Tsukuda ........... | H01M 10/0413 |
| | | | 429/178 |

FOREIGN PATENT DOCUMENTS

| JP | 2000-277160 A | 10/2000 | |
| KR | 10-2004-0016701 A | 2/2004 | |
| KR | 10-2008-0017264 A | 2/2008 | |
| KR | 10-2011-0107448 A | 10/2011 | |
| KR | 20130036994 A | * 4/2013 | .............. H01M 2/02 |
| KR | 10-2014-0103402 A | 8/2014 | |

OTHER PUBLICATIONS

Machine Translation KR20130036994(A) (Year: 2013).*

* cited by examiner

*Primary Examiner* — Jonathan G Leong
*Assistant Examiner* — Victoria H Lynch
(74) *Attorney, Agent, or Firm* — Knobbe Martens Olson & Bear LLP

(57) ABSTRACT

A secondary battery is disclosed. In one aspect, the secondary battery includes an electrode assembly and a case comprising an accommodation region configured to accommodate the electrode assembly. The accommodation region has a first width in a center area thereof and a second width in opposing ends thereof, and wherein the second width is greater than the first width. When the case configured to accommodate the electrode assembly is formed, formation errors caused by concentration of stress such as tearing of a raw material or thickness deviations may be prevented.

17 Claims, 4 Drawing Sheets

SECONDARY BATTERY

CROSS-REFERENCE TO RELATED APPLICATION

This application claims the benefit of Korean Patent Application No. 10-2015-0163337, filed on Nov. 20, 2015, in the Korean Intellectual Property Office, the disclosure of which is incorporated herein in its entirety by reference.

BACKGROUND

Field

The described technology generally relates to a secondary battery.

Description of the Related Technology

The use of secondary batteries as power sources has markedly increased in tandem with technological advances for mobile devices such as cellular phones or laptop computers and the increase in the size of the market. Recently, much research has been directed to developing secondary batteries for use in electric vehicles or hybrid vehicles as substitutes for internal combustion engine that rely on fossil fuels.

The demand for high-density secondary batteries having high capacity relative to size is increasing along with the requirement for size reduction on many types of electronic devices.

SUMMARY OF CERTAIN INVENTIVE ASPECTS

One inventive aspect relates to a high-density secondary battery having a high packing ratio.

Another aspect is a secondary battery configured to prevent formation errors caused by concentration of stress such as tearing of a raw material or thickness deviations when a case for accommodating an electrode assembly is formed.

Another aspect is a secondary battery that includes: an electrode assembly; and a case including an accommodation region configured to accommodate the electrode assembly, wherein along a side of the accommodation region, a width of a center area of the accommodation region is smaller than a width of an end and a width of the other end of the accommodation region.

The accommodation region may have an approximately rectangular shape with a pair of first and second sides facing each other and a pair of third and fourth sides facing each other.

Along the first and second sides, the width of the center area of the accommodation region may be smaller than the width of the end and the width of the other end of the accommodation region.

A lead member of the electrode assembly may extend outward through the third side of the accommodation region.

The first and second sides may be relatively long sides, and the third and fourth sides may be relatively short sides.

The first and second sides may have an inwardly concave round shape.

Corners at which the first and second sides meet the third and fourth sides may have an outwardly protruding convex round shape.

The corners may have a circular arc shape.

The first and second sides and the corners may be rounded in opposite directions in a concave-convex shape.

The first and second sides and the corners may be smoothly connected to each other.

Straight lines may not be formed between the first and second sides and the corners.

The case may include a flexible pouch.

Another aspect is a secondary battery comprising: an electrode assembly; and a case comprising an accommodation region configured to accommodate the electrode assembly, wherein the accommodation region has a first width in a center area thereof and a second width in opposing ends thereof, and wherein the second width is greater than the first width.

In the above secondary battery, the accommodation region has an approximately rectangular shape with a pair of first and second sides facing each other and a pair of third and fourth sides facing each other and smaller in length than the first and second sides. In the above secondary battery, the first width is defined between the center areas of the first and second sides, and wherein the second width is defined between opposing ends of the first side and the corresponding opposing ends of the second side. In the above secondary battery, the electrode assembly includes a lead member that extends outward through the third side of the accommodation region.

In the above secondary battery, the first and second sides are curved toward each other. In the above secondary battery, the first and second sides have an inwardly concave round shape. In the above secondary battery, corners at which the first and second sides meet the third and fourth sides have an outwardly protruding convex round shape. In the above secondary battery, the corners have a semi-circular arc shape. In the above secondary battery, the first and second sides and the corners are rounded in opposite directions in a concave-convex shape.

In the above secondary battery, the first and second sides and the corners are continuously connected to each other. In the above secondary battery, straight lines are not formed between the first and second sides and the corners. In the above secondary battery, a selected one of the third and fourth sides is inwardly curved toward the other one of the third and fourth sides. In the above secondary battery, the other one of the third and fourth sides is linear. In the above secondary battery, the case comprises a flexible pouch.

Another aspect is a secondary battery comprising: an electrode assembly; and a case comprising an accommodation region configured to accommodate the electrode assembly, wherein the accommodation region has a plurality of sides, wherein at least two of the sides that oppose each other are curved toward each other.

In the above secondary battery, the accommodation region has an approximately rectangular shape with a pair of first and second sides facing each other and a pair of third and fourth sides facing each other and smaller in length than the first and second sides. In the above secondary battery, the accommodation region has a first width in a center area thereof and a second width in opposing ends thereof, and wherein the second width is greater than the first width. In the above secondary battery, the first width is defined between the center areas of the first and second sides, and wherein the second width is defined between opposing ends of the first side and the corresponding opposing ends of the second side. In the above secondary battery, corners at which the first and second sides meet the third and fourth sides have an outwardly protruding convex round shape. In the above secondary battery, the corners have an approximately semi-circular arc shape.

BRIEF DESCRIPTION OF THE DRAWINGS

These and/or other aspects will become apparent and more readily appreciated from the following description of the exemplary embodiments, taken in conjunction with the accompanying drawings.

DETAILED DESCRIPTION OF CERTAIN INVENTIVE EMBODIMENTS

Figure 1:
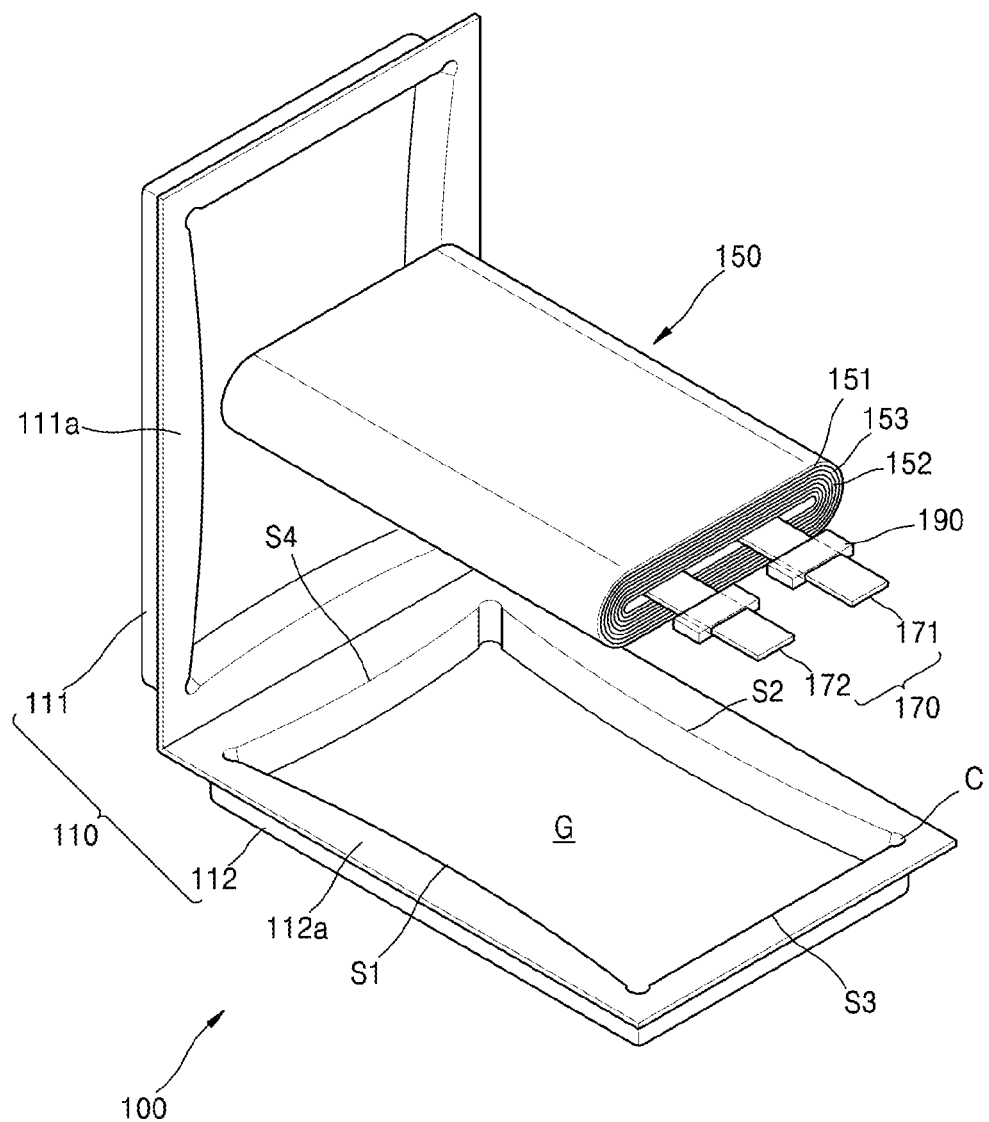
FIG. 1 is an exploded perspective view illustrating a secondary battery according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. In this disclosure, the term "substantially" includes the meanings of completely, almost completely or to any significant degree under some applications and in accordance with those skilled in the art. Moreover, "formed, disposed over positioned over" can also mean "formed, disposed or positioned on." The term "connected" includes an electrical connection.

Hereinafter, a secondary battery will be described with reference to the accompanying drawings, in which exemplary embodiments are shown.

Figure 2:
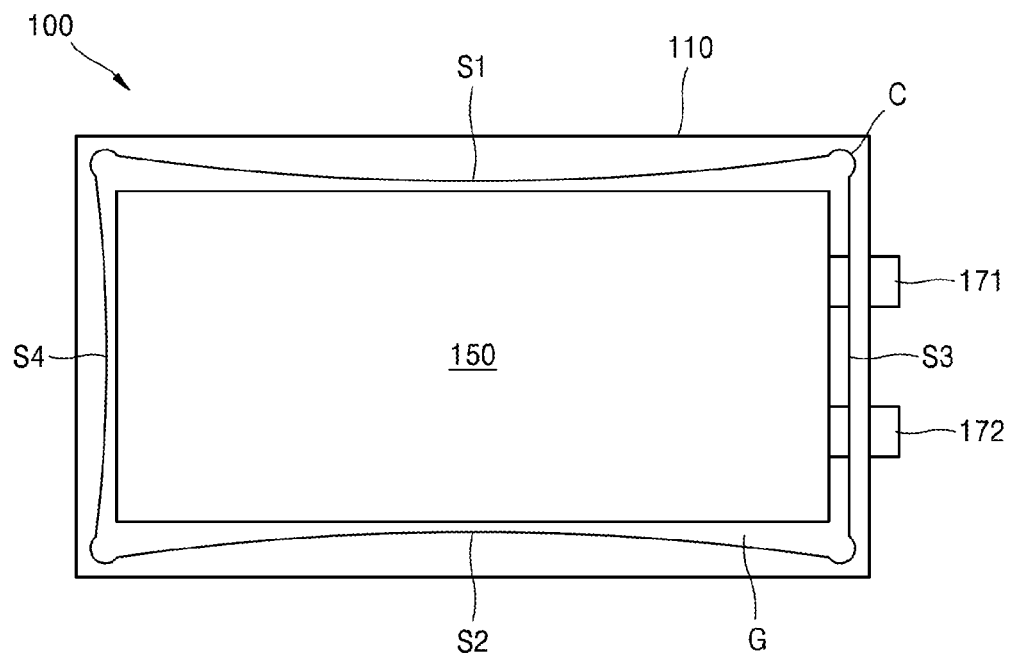
FIG. 2 is a plan view illustrating the secondary battery depicted in FIG. 1.
Figure 3:
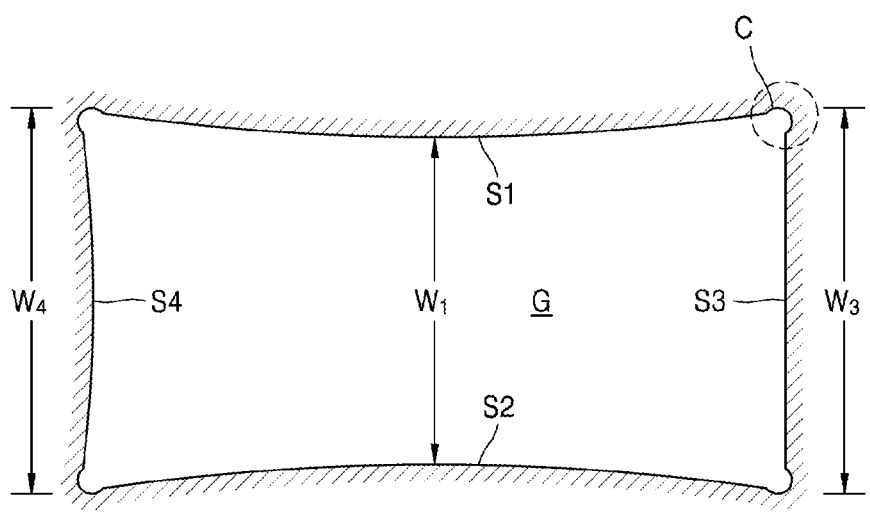
FIG. 3 is a plan view illustrating a case depicted in FIG. 1.
Figure 4:
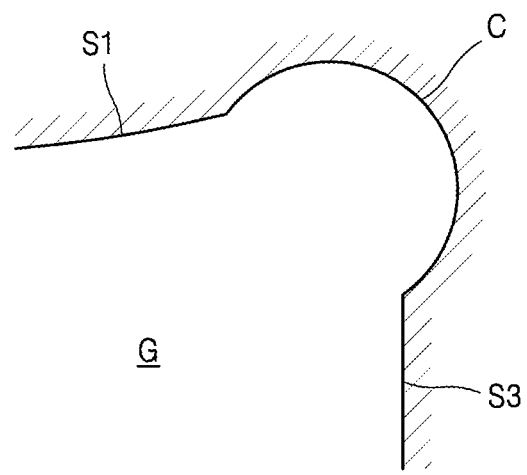
FIG. 4 is an enlarged view illustrating a portion of the case depicted in FIG. 3.

FIG. 1 is an exploded perspective view illustrating a secondary battery 100 according to an exemplary embodiment. FIG. 2 is a plan view illustrating the secondary battery 100 depicted in FIG. 1. FIG. 3 is a plan view illustrating a case 110 depicted in FIG. 1. FIG. 4 is an enlarged view illustrating a portion of the case 110 depicted in FIG. 3.

Referring to FIGS. 1 to 4, the secondary battery 100 includes an electrode assembly 150 and the case 110 forming an accommodation region G for accommodating the electrode assembly 150.

The electrode assembly 150 may include first and second electrode plates 151 and 152 having different polarities; and a separator 153 disposed between the first and second electrode plates 151 and 152. For example, the electrode assembly 150 is formed by disposing the separator 153 between the first and second electrode plates 151 and 152 and winding the first and second electrode plates 151 and 152 and the separator 153 in the form of a jelly-roll. In another exemplary embodiment, however, the electrode assembly 150 is formed as a stacked-type electrode assembly by stacking the first and second electrode plates 151 and 152 with the separator 153 being disposed therebetween.

The electrode assembly 150 may include lead members 170. For example, the electrode assembly 150 may include first and second lead members 171 and 172 electrically connected to the first and second electrode plates 151 and 152. The first and second lead members 171 and 172 may extend to the outside of the case 110 to form a charge-discharge current path. Insulating members 190 may be disposed around the first and second lead members 171 and 172. For example, the insulating members 190 may be disposed around the first and second lead members 171 and 172 at positions facing the case 110 so as to insulate the first and second lead members 171 and 172 from the case 110 and seal gaps between the case 110 and the first and second lead members 171 and 172.

As described later, the accommodation region G may include a pair of first and second sides S1 and S2 facing each other and a pair of third and fourth sides S3 and S4 facing each other. In this case, the lead members 170 may extend to the outside of the case 110 through the third side S3 of the accommodation region G.

The case 110 may provide the accommodation region G to accommodate the electrode assembly 150. For example, the case 110 may include a first case 111 and a second case 112, and the first and second cases 111 and 112 may be jointed together in mutually facing directions with the electrode assembly 150 being disposed therebetween. Sealing parts 111a and 112a may be disposed along mutually-facing edges of the first and second cases 111 and 112. For example, the first and second cases 111 and 112 may accommodate the electrode assembly 150 and may then be joined together in mutually facing directions. The sealing parts 111a and 112a of the first and second cases 111 and 112 may be thermally bonded so as to seal the electrode assembly 150 accommodated in the first and second cases 111 and 112.

In the exemplary embodiment, the first and second cases 111 and 112 may define the accommodation region G for the electrode assembly 150. The first and second cases 111 and 112 may be substantially symmetrical to each other and may each define half of the accommodation region G. Technical aspects of the accommodation region G that will be described may be commonly applied to the first and second cases 111 and 112. For conciseness of description, the accommodation region G will be described in relation to one of the first and second cases 111 and 112, for example, the first case 111. However, technical aspects of the accommodation region G described in relation to the first case 111 may commonly be applied to the second case 112.

In another exemplary embodiment, the first and second cases 111 and 112 have different shapes. For example, the first case 111 is provided in the form of a concave container to define the accommodation region G for the electrode assembly 150, and the second case 112 is provided in the form of a flat cover to cover the accommodation region G. Technical aspects that will now be described in relation to the shape of the accommodation region G may be applied to the first case 111.

Referring to FIG. 3, a width W1 of a center area of the accommodation region G along a side of the accommodation region G may be smaller than a width W3 of an end of the accommodation region G and a width W4 of the other end of the accommodation region G. For example, as described above, the accommodation region G includes a pair of first and second sides S1 and S2 facing each other and a pair of third and fourth sides S3 and S4 facing each other. Along the first and second sides S1 and S2 of the accommodation region G, the width W1 of the center area may be smaller than the width W3 of the end of the accommodation region G and the width W4 of the other end of the accommodation region G. The end of the accommodation region G may refer to an end relatively close to the lead members 170 along the first and second sides S1 and S2, and the other end of the accommodation region G may refer to an end relatively distant from the lead members 170 along the first and second sides S1 and S2. In other words, the end and the other end may refer to opposite ends along the first and second sides S1 and S2.

The accommodation region G may have an approximately rectangular shape. The first and second sides S1 and S2 may be relatively long sides, and the third and fourth sides S3 and S4 may be relatively short sides. The lead members 170 may extend through the third side S3. Unless otherwise specified in the following description, the first and second sides S1 and S2 may be long sides, and the third and fourth sides S3 and S4 may be short sides that are shorter than the first and second sides S1 and S2.

Along the first and second sides S1 and S2, the width W1 of the center area of the accommodation region G may be smaller than the width W3 of the end and the width W4 of the other end of the accommodation region G. That is, the width W1 of the center area may be smaller than any one of the width W3 of the end and the width W4 of the other end of the accommodation region G. The width W1 of the center area is relatively small because the first and second sides S1 and S2 are not parallel with each other but are curved inward in a concave shape between the end and the other end of the accommodation region G. The first and second sides S1 and S2 may not be straight but may be rounded inward in a concave shape.

Corners C at which the first and second sides S1 and S2 meet the third and fourth sides S3 and S4 may have a rounded shape protruding outward. For example, the corners C have an outwardly convex shape such as an approximately semi-circular arc shape.

The first and second sides S1 and S2 may be rounded inward in a concave shape, and the corners C may be rounded in an outwardly convex shape. The first and second sides S1 and S2 and the corners C may be formed in a concave-convex shape having centers of curvature in opposite directions. The first and second sides S1 and S2 may have centers of curvature outside the accommodation region G, and the corners C may have centers of curvature inside the accommodation region G. For example, the first and second sides S1 and S2 and the corners C have curvatures with opposite signs.

Since the first and second sides S1 and S2 are rounded, the secondary battery may have a high packing ratio. The term "packing ratio" may refer to a ratio of the area of the electrode assembly 150 to the area of the accommodation region G. If the secondary battery has a high packing ratio, the secondary battery may have a high degree of capacity relative to the area of the accommodation region G. That is, the secondary battery may be a high-density secondary battery.

When the area of the accommodation region G is fixed, the packing ratio of the secondary battery may be increased by increasing the area of the electrode assembly 150, that is, the areas of the first and second electrode plates 151 and 152 and the separator 153. When the area of the accommodation region G is fixed, the packing ratio of the secondary battery may be increased by densely disposing the electrode assembly 150 in the accommodation region G while reducing a surplus region of the accommodation region G. In this case, however, the case 110 and the electrode assembly 150 may have to be separated from each other for insulation, and thus the surplus region of the accommodation region G may be minimally maintained.

In the exemplary embodiment, the first and second sides S1 and S2 are curved inward in a concave shape to form the corners C in a protruding shape, and thus sufficient margins may be provided at the corners C. Each of the corners C may have a semi-circular shape. Therefore, the electrode assembly 150 may be more densely disposed in the case 110.

Referring to FIG. 4, the corners C formed at both ends of the first and second sides S1 and S2 may convexly protrude outward from the accommodation region G, for example, in the form of circular arcs.

Figure 5:
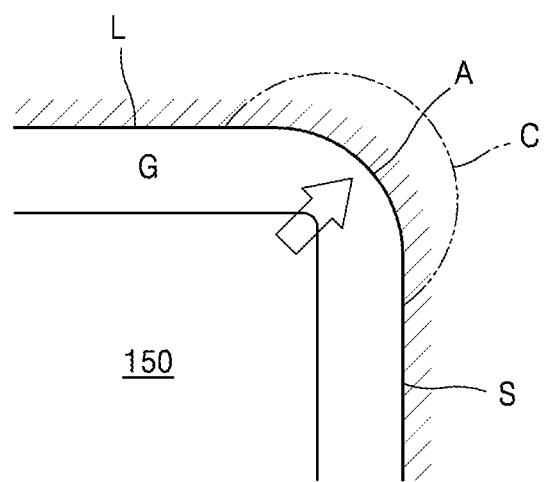
FIG. 5 is a view illustrating a secondary battery according to a comparative example for comparison with the secondary battery of the exemplary embodiment.

FIG. 5 is a view illustrating a secondary battery according to a comparative example for comparison with the secondary battery of the exemplary embodiment.

Referring to FIG. 5, an accommodation region G for accommodating an electrode assembly 150 may have a rectangular shape with a pair of long sides L and a pair of short sides S. In this case, corners A at which the long sides L and the short sides S meet each other may be rounded. Since the corners A are inwardly rounded like a chamfer, the area of the accommodation region G is reduced, and the area of the electrode assembly 150 is also reduced so that the electrode assembly 150 may be separate from the corners A.

In the exemplary embodiment, however, the first and second sides S1 and S2 are inwardly concave in a round shape. Therefore, the corners C may be formed in an outwardly protruding convex shape. For example, since the first and second sides S1 and S2 are inwardly curved, both ends of the first and second sides S1 and S2 may be located farther outward, and thus the corners C may be formed in an outwardly protruding convex shape. Unlike the corners A inwardly rounded like a chamfer, the corners C have an outwardly protruding convex shape, and thus it may not be necessary to reduce the area of the electrode assembly 150 to avoid contact with the corners C. This has an effect of increasing the area of the electrode assembly 150, and thus the packing ratio of the secondary battery may be increased.

Figure 6:
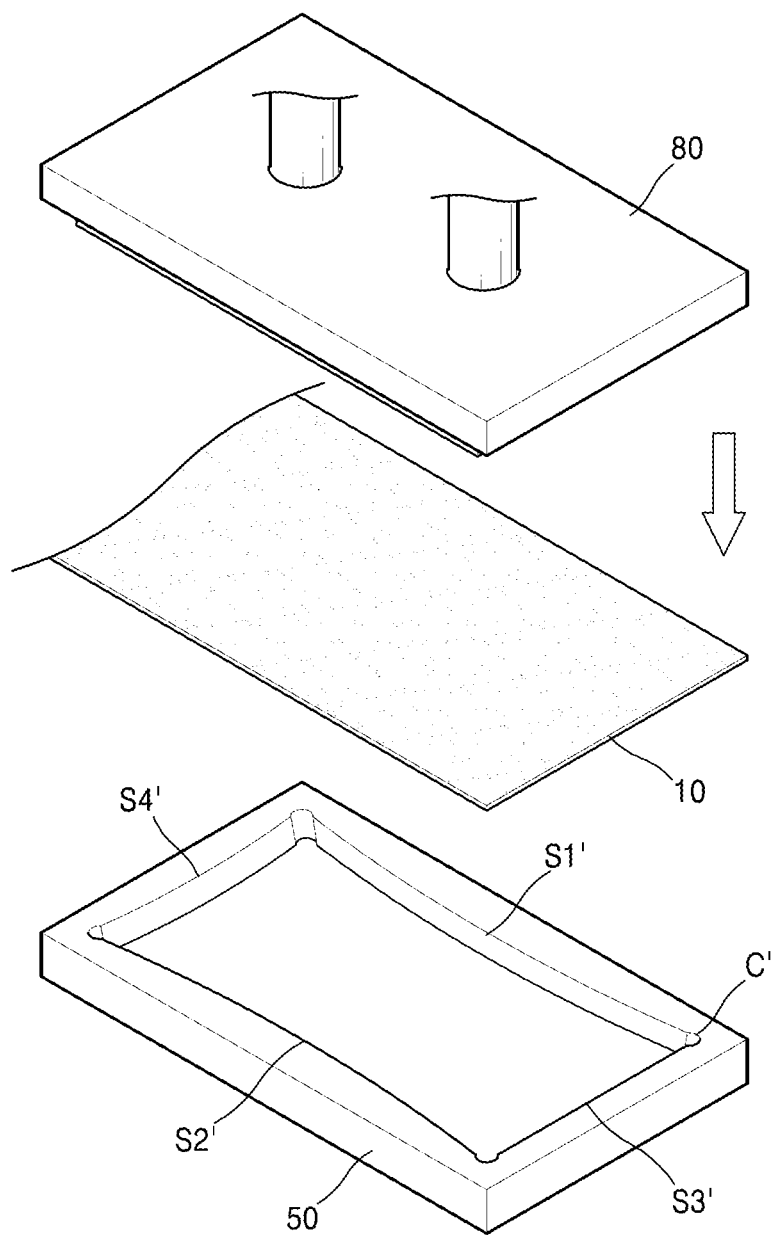
FIG. 6 is a view illustrating case forming processes.

FIG. 6 is a view illustrating case forming processes.

Referring to FIG. 6 the case 110 may be formed by disposing a raw material 10 between a die 50 and a punch 80 and pushing the punch 80 downward toward the die 50 to stretch the raw material 10. At this time, the die 50 stretches the raw material 10 to form an accommodation region G. To this end, the die 50 may have substantially the same shape as the accommodation region G. For example, the die 50 may be larger than the accommodation region G to allow for the flow of the raw material 10. In this case, however, the die 50 may have substantially the same shape as the accommodation region G.

The die 50 may include a pair of first and second sides S1' and S2' facing each other and a pair of third and fourth sides S3' and S4' facing each other. The first and second sides S1' and S2' may be inwardly rounded in a concave shape. In addition, corners C' located at both ends of the first and second sides S1' and S2' may have an outwardly protruding convex shape. Since the corners C' allow for the flow of the raw material 10, the accommodation region G may have corners C protruding outward.

The first and second sides S1' and S2' may be rounded in an inwardly concave shape, and the corners C' may be rounded in an outwardly convex shape. Since the first and second sides S1' and S2' and the corners C' are rounded with curvatures of opposite signs, the raw material 10 may be smoothly stretched and formed into the case 110. That is, when the case 110 is formed, if the flow of the raw material 10 is not smooth and is thus blocked to cause concentration of stress, formation errors may occur such as the raw material 10 being torn or locally thinned. Since the first and second sides S1' and S2' and the corners C' are rounded in different directions to have a concave-convex shape and are thus smoothly connected to each other, when the case 110 is formed, the flow of the raw material 10 may be smooth, and thus formation errors caused by concentration of stress may be prevented.

Referring to FIG. 3, the first and second sides S1 and S2 and the corners C are smoothly or continuously connected to each other. The first and second sides S1 and S2 and the corners C may have a concave-convex shape and may be smoothly or continuously connected to each other, and straight lines or discontinuous portions may not be formed between the first and second sides S1 and S2 and the corners C.

If straight lines are formed between the first and second sides S1 and S2 and the corners C, stress may concentrate on boundaries between the straight lines and the round shapes of the first and second sides S1 and S2 and the corners C. In this situation, when the case 110 is formed, the possibility of cracks may be increased. The case 110 may be formed as a flexible pouch. In this case, when the case 110 is formed, the first and second sides S1 and S2 and the corners C may be smoothly connected in a concave-convex shape, and thus the case 110 may not be damaged during the formation process.

As described above, according to at least one of the disclosed embodiments, the secondary battery may be provided as a high-density secondary battery having a high packing ratio. The secondary battery may be provided as a high-density secondary battery by increasing the area of the electrode assembly 150 relative to the area of the accommodation region G, that is, by increasing the packing ratio of the secondary battery.

In addition, when the case 110 accommodating the electrode assembly 150 is manufactured, the flow of a raw material in a die may be smooth, thereby preventing formation errors caused by concentration of stress such as tearing of the raw material or thickness deviations.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details may be made therein without departing from the spirit and scope as defined by the following claims.

What is claimed is:

1. A secondary battery comprising:
   an electrode assembly; and
   a case comprising an accommodation region configured to accommodate the electrode assembly, wherein the accommodation region has a first width in a center area thereof and a second width in opposing ends thereof, and wherein the second width is greater than the first width, and wherein the accommodation region has a width gradually increasing from the first width at the center area to the second width at the opposing ends,
   wherein the accommodation region has an approximately rectangular shape with a pair of first and second sides facing each other and a pair of third and fourth sides facing each other and smaller in length than the first and second sides, wherein the first side has a first end and the third side has a third end adjacent to the first end, and
   wherein the accommodation region includes a first corner portion formed by outwardly protruding from the first end and the third end such that the first corner portion forms an obtuse angle with respect to each of the first side and the third side.

2. The secondary battery of claim 1, wherein the first width is defined between the center areas of the first and second sides, and wherein the second width is defined between opposing ends of the first side and the corresponding opposing ends of the second side.

3. The secondary battery of claim 2, wherein the electrode assembly includes a lead member that extends outward through the third side of the accommodation region.

4. The secondary battery of claim 2, wherein the first and second sides are curved toward each other.

5. The secondary battery of claim 2, wherein the first and second sides have an inwardly concave round shape.

6. The secondary battery of claim 1, wherein the first corner portion has a semi-circular arc shape.

7. The secondary battery of claim 1, wherein the accommodation region includes a second corner portion formed by the second side and the third side, and wherein i) the first side and part of the first corner portion directly extending from the first side and ii) the second side and part of the second corner portion directly extending from the second side are rounded in opposite directions in a concave-convex shape.

8. The secondary battery of claim 7, wherein the first and second sides and the first and second corner portions are continuously connected to each other.

9. The secondary battery of claim 8, wherein straight lines are not formed between the first and second sides and the first and second corner portions.

10. The secondary battery of claim 1, wherein a selected one of the third and fourth sides is inwardly curved toward the other one of the third and fourth sides.

11. The secondary battery of claim 10, wherein the other one of the third and fourth sides is linear.

12. The secondary battery of claim 1, wherein the case comprises a flexible pouch.

13. The secondary battery of claim 1, wherein the case comprises a first case and a second case detachable from and attachable to each other and respectively accommodating lower and upper portions of the electrode assembly, wherein each of the first and second cases includes a first accommodation region and a second accommodation region together forming the accommodation region, and wherein each of the first and second accommodation regions has a width gradually increasing from a center area to opposing ends thereof.

14. A secondary battery comprising:
    an electrode assembly; and
    a case comprising an accommodation region configured to accommodate the electrode assembly, wherein the accommodation region has an approximately rectangular shape with a pair of first and second sides facing each other and a pair of third and fourth sides facing each other and smaller in length than the first and second sides, wherein the first and second sides are curved toward each other, and
    wherein the accommodation region has a width gradually increasing from a center area of each of the first and second sides to opposing ends of each of the first and second sides,
    wherein the first side has a first end and the third side has a third end adjacent to the first end, and wherein the accommodation region includes a corner portion formed by outwardly protruding from the first end and the third end such that the corner portion forms an obtuse angle with respect to each of the first side and the third side.

15. The secondary battery of claim 14, wherein the accommodation region has a first width in the center area thereof and a second width in the opposing ends thereof, and wherein the second width is greater than the first width.

16. The secondary battery of claim 15, wherein the first width is defined between the center areas of the first and second sides, and wherein the second width is defined between opposing ends of the first side and the corresponding opposing ends of the second side.

17. The secondary battery of claim 14, wherein the corner portion has an approximately semi-circular arc shape.

\* \* \* \* \*